United States Patent [19]

DeBonte et al.

[11] 4,366,490

[45] Dec. 28, 1982

[54] METHOD AND APPARATUS FOR TUNING INK JETS

[75] Inventors: William J. DeBonte, Kent; Karen Lynch, New Milford, both of Conn.

[73] Assignee: Exxon Research and Engineering Co., Florham Park, N.J.

[21] Appl. No.: 350,191

[22] Filed: Feb. 19, 1982

Related U.S. Application Data

[63] Continuation of Ser. No. 186,261, Sep. 11, 1980, abandoned.

[51] Int. Cl.[3] .......... G01D 15/18

[52] U.S. Cl. .......... 346/140 R

[58] Field of Search .......... 346/1.1, 75, 140 R, 346/140 PQ, 140 IJ

[56] References Cited

U.S. PATENT DOCUMENTS

| | | | |
|---|---|---|---|
| 3,281,859 | 10/1966 | Stone | 346/140 IJ X |
| 3,813,676 | 5/1974 | Wolfe | 346/75 |
| 3,972,474 | 8/1976 | Keur | 346/75 X |

*Primary Examiner*—Donald A. Griffin

*Attorney, Agent, or Firm*—Kenneth Watov

[57] ABSTRACT

Portions of ink jet transducers are deactivated so as to tune the transducer to the transducer drive rather than vice versa. Deactivation may be accomplished by creating a discontinuity in a conductive coating on the transducer or by partially depoling the transducer.

18 Claims, 12 Drawing Figures

METHOD AND APPARATUS FOR TUNING INK JETS

This is a continuation of application Ser. No. 186,261, filed Sept. 11, 1980 now abandoned.

BACKGROUND OF THE INVENTION

This invention relates to an ink jet system of the type which ejects droplets of ink from an orifice.

Various types of ink jet systems are common in the art. One type of system is known as impulse ink jet which employs a transducer suitably energized so as to eject a droplet of ink from the jet on demand. In one form, an impulse ink jet includes a cylindrical tube with an orifice surrounded by a cylindrical transducer. As the transducer is energized to produce a contraction in the cylindrical tube, ink supplied from a reservoir is ejected from the orifice.

It has been generally observed that transducer-driven ink-jets of apparently identical construction do not all operate over a single operating voltage range. This variation in operating voltage may result from such factors as variations in transducer material from piece to piece, variation in the acoustic coupling between the transducer and the remainder of the jet, or from other variations in structure which are not simple to control on a dimensional basis.

These variations are troublesome in a manufacturing environment because they require the transducer driving electronics be tuned to the jets on an individual basis where variations in transducer performance alone can be of the order of 15% to 20%. The problem is made more complex by the fact that the operating life time of the jet in a marketable product is generally far shorter than the life time of the transducer driving electronics. As a consequence, the jet must be field-replaceable and compatible with the existing electronics where the electronics must be capable of being tuned to the jet--an option which would add to the cost of the driver electronics and would require services of a trained field representative.

SUMMARY OF THE INVENTION

It is one object of this invention to facilitate the manufacture of ink jets.

It is another object of this invention to facilitate the maintenance of ink jets.

It is a more specific object of this invention to facilitate the manufacture and maintenance by fabricating ink jets which can be tuned to a common operating voltage.

It is still a more specific object of this invention to facilitate the manufacture and maintenance by fabricating ink jets which can be tuned to a common operating voltage so as to minimize the requirement for reproducibility in the mechanical construction of the ink jets.

In accordance with the foregoing and other objects of the invention, a preferred embodiment comprises an ink jet apparatus including transducer means, a chamber including the droplet orifice in communication with the transducer means and energizing means coupled to the transducer means. In order to tune the ink jet to the desired operating voltage, a portion of the transducer means is deactivated.

In the preferred embodiment of the invention, the transducer means comprises a deforming means and conductive means juxtaposed to the deforming means. The deactivation is accomplished by removing a segment of the conductive means to form a discontinuity therein, thereby decoupling a portion of the transducer means from the energizing means.

In another embodiment of the invention, more than one discontinuity is provided. The transducer means may then be tuned by selectively bridging at least one discontinuity with a conductive material. Various techniques may be utilized to remove a segment of the conductive means, for example, chemical etching and mechanical scribing may be utilized. One preferred technique for mechanical scribing is microsandblasting. In a particularly preferred embodiment of the invention, the transducer means is substantially cylindrical and surrounds a substantially cylindrical chamber. The discontinuities encircle the conductive means which is applied as a coating on the surface of the cylindrical transducer. In performing tuning, the initial overall length of the transducer is first determined and the operating voltage for the overall length of the transducer is also determined. Another operating voltage for the transducer is then selected and a portion of the transducer is decoupled such that the transducer has a new effective length.

In another embodiment of the invention, the transducer means is substantially planar and the discontinuity in the transducer means extends along a conductive means coated on the surface of the planar transducer means.

DETAILED DESCRIPTION OF A PREFERRED EMBODIMENT

Figure 1:
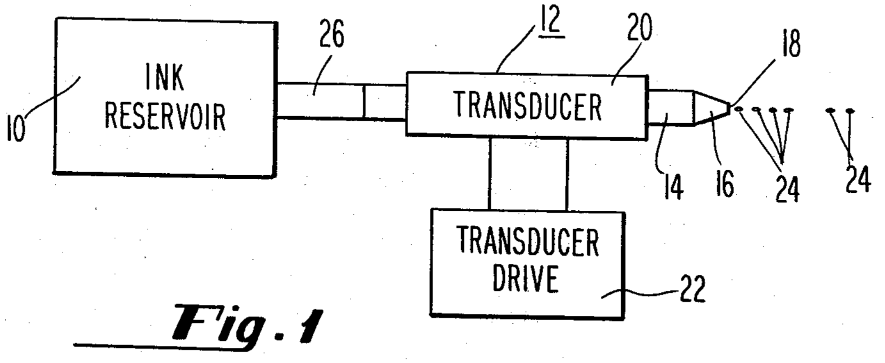
FIG. 1 is a block diagram of an ink jet system in which the subject invention may be embodied.

Referring to FIG. 1, an ink reservoir 10 is coupled to an ink jet 12 comprising a cylindrical, tubular chamber 14 terminated in a nozzle 16 with an orifice 18. The ink jet 12 further comprises a cylindrical transducer 20 which surrounds the chamber 14. The transducer 12 is electrically coupled to a transducer drive circuit 22. The ink reservoir 10 is coupled to the tubular chamber 14 by a hose 26.

When the transducer drive 22 energizes the transducer 20 so as to contract the size of the chamber 14, droplets of ink 24 are projected from the orifice 18. The droplets 24 are generated on demand, i.e., they are generated as the transducer drive energizes the transducer 20. When the transducer 20 is not energized, the droplets 24 are not projected from the orifice 18.

In accordance with this invention, the transducer 20 may actually be tuned to the particular transducer drive 22 as will now be discussed in somewhat more detail by reference to FIGS. 2 and 3.

Figure 2:
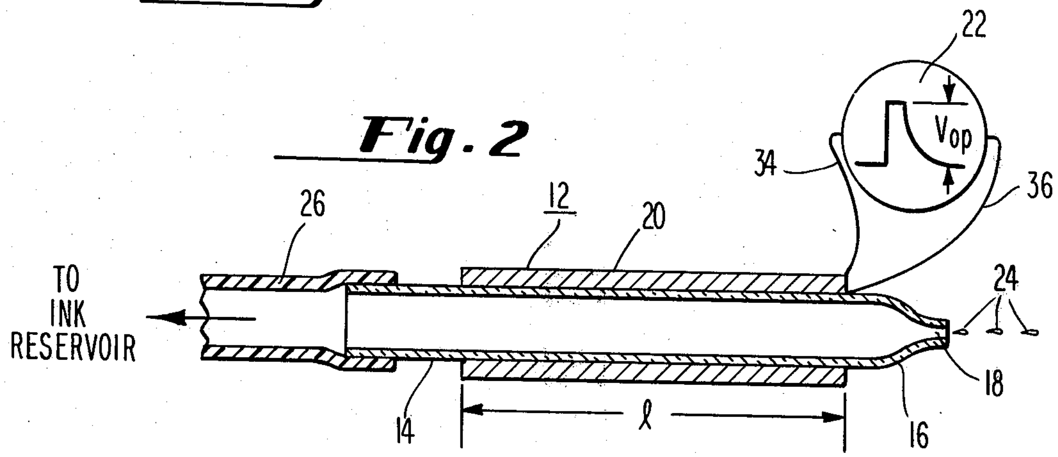
FIGS. 2 and 3 are enlarged schematic sectional views of the transducer droplet forming apparatus of FIG. 1 depicting the manner of tuning the transducer.

Referring first to FIG. 2, it will be seen that the transducer 20 has an overall length l which extends along the tubular chamber 14. This particular length l of the transducer 20 requires a certain operating voltage $V_{op}$ to effectively drive the transducer 20. However, for reasons set forth in the background of the invention, it is not necessarily desirable to adjust the operating voltage generated by the transducer drive 22. It therefore becomes desirable to tune the transducer 20 to the particular transducer drive 22 as may be seen by reference to FIG. 3.

Figure 3:
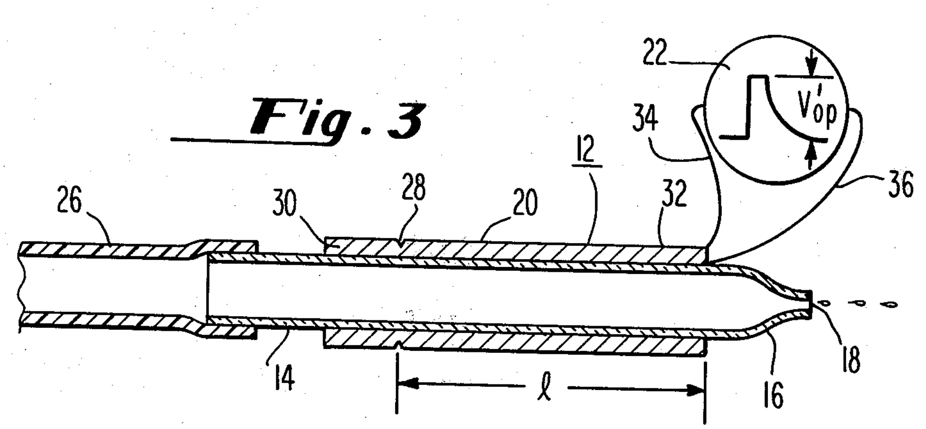

As shown in FIG. 3, the effective transducer length is reduced to length l' by forming a discontinuity 28 in an outermost surface of the transducer 20. The discontinuity 28 separates one portion 30 from one portion 32 of the transducer 20 and, as will be described in somewhat more detail with reference to FIG. 4, effectively decouples the one portion 30 from the transducer drive 22 such that the operating voltage for the coupled portion 32 becomes $V_{op'}$ which is determined in accordance with the equation: $V_{op'}=l\times V_{op}/l'$ where l is the original length of the transducer, $V_{op}$ is the operating voltage of the transducer of length l, l' is the new effective length of the transducer, and $V_{op'}$ is the new operating voltage of the transducer of length l'.

As shown in FIGS. 2 and 3, the transducer drive 22 is schematically represented as connected to the inner and outer surfaces of the transducer 20 through leads 34 and 36. In actuality, the leads 34 and 36 are coupled to inner and outer conductive surfaces of the transducer 20 which will now be described in greater detail with reference to FIG. 4.

Figure 4:
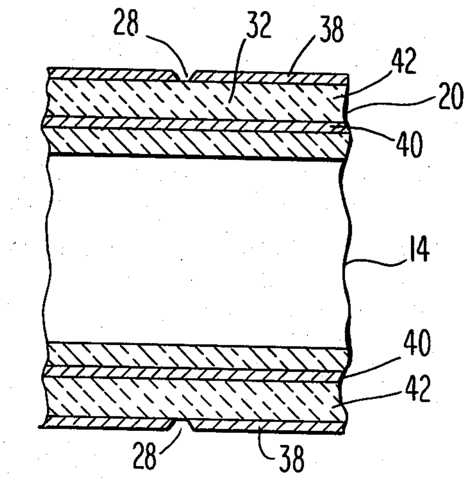
FIG. 4 is an enlarged sectional view of a portion of the transducer and ink droplet producing apparatus shown in FIG. 3.

As shown in FIG. 4, the transducer 20 includes an outer conductive portion 38 and an inner conductive portion 40. The outer conductive portion 38 is connected to the transducer drive 22 by means of the lead 34 not shown in FIG. 4. Similarly, the inner conductive surface 40 is connected to the transducer drive 22 by means of the lead 36 not shown in FIG. 4.

The inner portion of the transducer 20 comprises a suitable material such as a piezoelectric ceramic material 42 which characteristically expands and contracts in response to the voltage placed across the transducer between the conductive surfaces 38 and 40. Typically, the surfaces 38 and 40 are applied as metallic coatings on the transducer material 42. A portion of the coating 38 is then removed to form the discontinuity 28. It will be noted that the discontinuity 28 is full and complete, i.e., there is no conductive material bridging the conductive portions on either side of the discontinuity 28. Accordingly, the one portion 30 of the transducer 20 is effectively decoupled from the transducer drive circuit 22 so as to alter the length l of the transducer as shown in FIGS. 2 and 3 thereby changing the effective operating voltage of the transducer drive 22 for the transducer 20 from $V_{op}$ to $V_{op'}$.

While the impulse ink jets generally operate over a range of drive voltages, for simplicity of discussions herein, the operating voltage $V_{op}$ of a jet is defined as that voltage in which the ink droplets obtain a predetermined velocity when the jet is operated in an uninterrupted mode. A suitable velocity for purposes of discussion is 1.6 meters per second.

It has been found that the average operating voltage of an apparently uniform group of ink jets of the type shown in FIGS. 2 and 3 varies inversely as the transducer length l. In other words, halving the transducer length results in a doubling of the operating voltage. While an individual jet may have its operating voltage shifted off from the average by the sources of variations discussed above or other sources of variations, it is expected that the operating voltage of an individual jet will vary inversely as the length of its transducer.

As a consequence of this relationship between the transducer length and jet operating voltage, it is possible to tune the operating voltages of individual jets upward to some preselected voltage by altering the length of the individual transducer after determining the initial post-assembly operating voltages of the individual jets. If, for example, an assembled jet with a transducer length l has an operating voltage $V_{op}$ the operating voltage can be altered to a new value $V_{op'}$ by effectively changing the transducer length to a new length l' determined by the equation: $l'=l\times V_{op}/V_{op'}$.

As shown in FIGS. 2–4, it is relatively simple to decrease the effective transducer length by electrically disconnecting or decoupling part of the transducer from the end at which the input voltage is applied, making $V_{op'}$ larger than $V_{op}$ by a predetermined amount. This effective alteration in length may be achieved by removing a segment of the outer conductive surface or metalized coating 38 at the proper location to form the discontinuity 28 in accordance with the above equation.

In the foregoing, the shortening of the transducer 20 has been described. However, the transducer need not necessarily be shortened. In fact, the transducer may be lengthened as shown in FIG. 5 to achieve the desired operating voltage.

Figure 5:
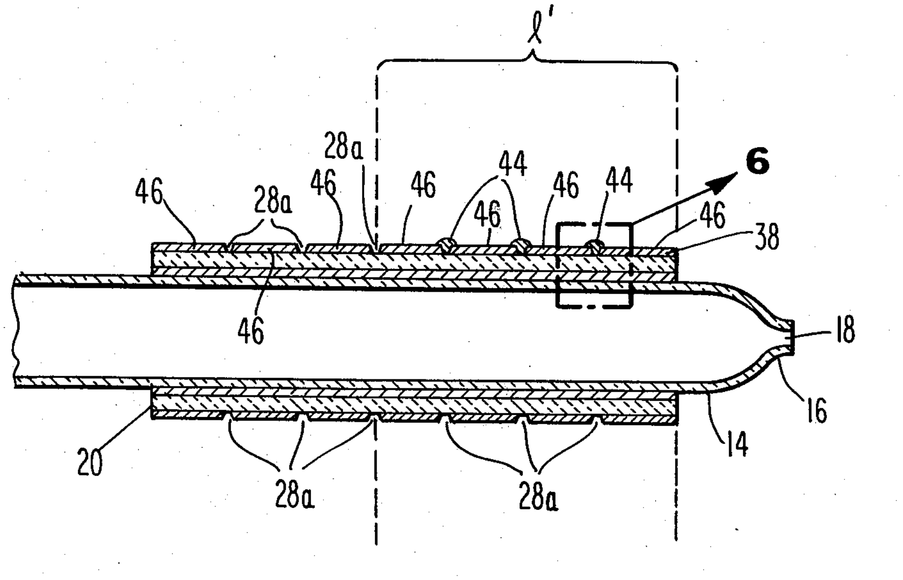
FIG. 5 is a sectional view of another transducer and ink droplet forming apparatus constructed in accordance with the principles of this invention.
Figure 6:
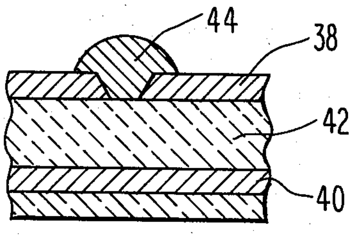
FIG. 6 is an enlarged view of a portion of the transducer and ink droplet forming apparatus shown in FIG. 5.
Figure 7:
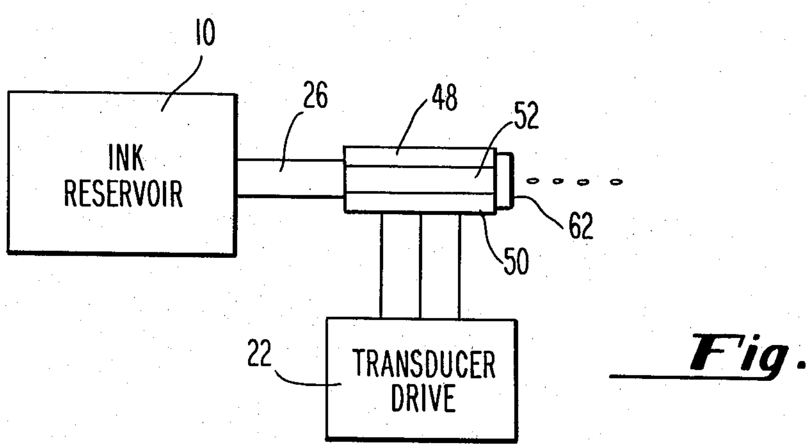
FIG. 7 is another block diagram of another system which may embody this invention.
Figure 8:
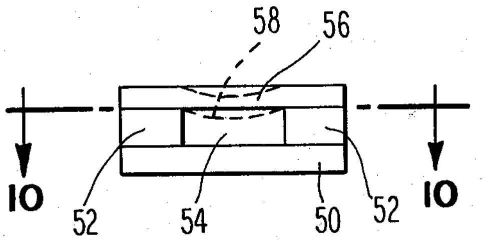
FIG. 8 is a sectional view of the transducer shown in FIG. 7.
Figure 9:
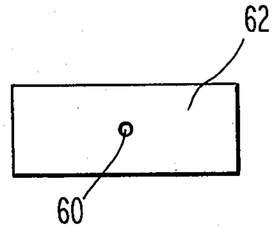
FIG. 9 is an end view of the transducer shown in FIG. 8.
Figure 10:
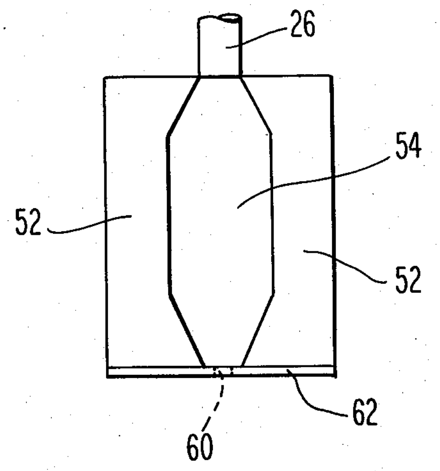
FIG. 10 is a sectional view taken along line 10—10 of FIG. 8.

As shown in FIG. 5, the outer conductive coating 38 includes a plurality of discontinuities 28*a* along the entire length of the transducer 20. In order to achieve the desired length l' in accordance with the above-discussed equations, a number of the discontinuities 28*a* along the length l' are bridged by conductive materials such as solder 44 as best shown in FIG. 6. As a result of the conductive bridges 44, the effective length of the transducer is increased by joining, in this example, the total of four portions 46 of the conductive surface 38.

In the previously described embodiments of the invention, the ink jet comprised a cylindrical chamber surrounded by a cylindrical transducer. With this configuration, tuning was achieved by varying the length of the transducer. However, it should be appreciated that the invention is equally applicable to tuning of ink jets of different configurations and the total area or volume of the transducer may be varied accordingly. In this regard, reference will now be made to FIGS. 8–12 for a description of yet another embodiment of the invention.

In FIGS. 8–12, an ink jet of a planar configuration is disclosed. The jet includes a support plate 50 and two plates 52 which form a chamber 54. The volume of the chamber 54 is varied by energizing a planar transducer 56 of a bimorph type which is deflected downwardly into the chamber 54 as depicted by the dotted lines 58 thereby forcing droplets of ink from an orifice 60 in an orifice plate 62.

Figure 11:
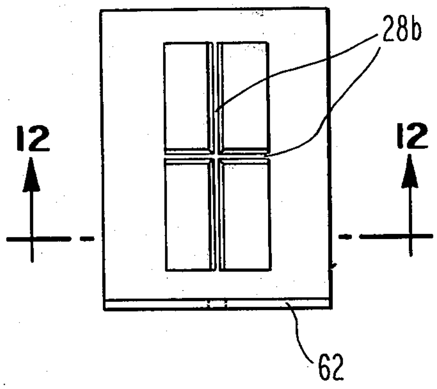
FIG. 11 is a plan view of the transducer and droplet forming apparatus of FIG. 8.
Figure 12:
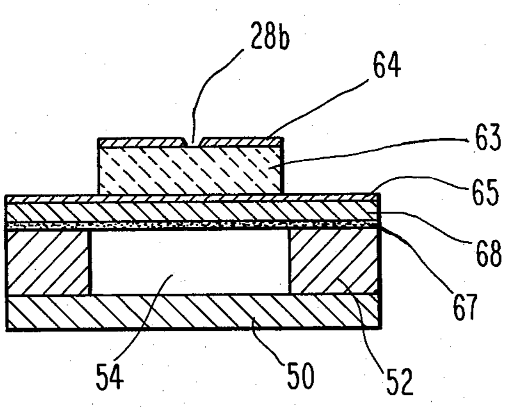
FIG. 12 is an enlarged sectional view of the transducer and ink droplet forming apparatus of FIG. 11 taken along line 12—12.

In accordance with this invention, discontinuities **28*b* may be formed in the conductive surface 64 as shown in FIGS. 11 and 12. The discontinuities 28*b* effectively subdivide the transducer 56 into rectangular sections. By connecting only an appropriate number of the rectangular sections to the transducer drive, the transducer 56** may be tuned to the desired voltage.

As shown in FIG. 12, the transducer 56 differs somewhat from that shown in FIGS. 1-6. More particularly, the transducer 56 is a bimorph comprising a piezoelectric sheet 63 in contact with an electrode 64 segmented by discontinuities **28*b* and adhered to a steel diaphragm 68. A conductive, bonding layer 65 joins the sheet 63 to the diaphragm 68; a layer of glue 67 then joins the diaphragm 68 to the plate 52**.

It will be appreciated that the transducer 56 may be sectioned off in a variety of different patterns, e.g., circles and triangles. It will further be appreciated that various segments may be connected by bridging the discontinuities with conductive material using the techniques shown in FIGS. 5 and 6 so as to in effect couple a number of sections together to increase the overall area of the transducer 56.

The discontinuities 28, **28*a* and 28*b*** may be formed in the conductive surfaces by a variety of techniques. These techniques include chemical etching, mechanical scribing or some other surface treatment. When preferred, techniques for forming the discontinuity include the use of a microsandblaster.

The invention has been in terms of decoupling a portion of the transducer from the means for energizing the transducer. It will, of course, be appreciated that other techniques may be employed including deactivating a portion of the transducer by, for example, exposure to laser light in limited areas or by otherwise treating to partially depole the piezoelectric material. It will also be appreciated that various transducer materials may be utilized which may be deactivated using various techniques.

Although the invention has been described in terms of impulse ink jets, it will be appreciated that this invention also has applicability to other forms of ink jets including continuous ink jet systems.

Although particular embodiments have been shown and described and other modifications and variations suggested, it will be understood that other embodiments and modifications will occur to those of ordinary skill in the art without departing from the true spirit and scope of the invention.

What is claimed is:

1. An ink jet apparatus comprising:

transducer means of predetermined length;

an ink chamber of fixed dimensions including a drop-emitting orifice in communication with said transducer;

energizing means coupled to said transducer means for energizing said transducer means by applying an operating signal thereto, whereby said chamber expands and contracts in response to the state of energization of said transducer means, for causing an ink drop to be emitted from said orifice; and said transducer means including means for deactivating a portion of said transducer means, for effectively changing the length thereof, thereby permitting said transducer means to be matched to said operating signal for tuning said ink jet.

2. The ink jet apparatus of claim 1 wherein said portion is deactivated by said deactivating means permitting decoupling of said deactivated portion from other portions of said transducer means.

3. The ink jet apparatus of claim 1 wherein said deactivating means includes conductive means and deforming means including said portion and another portion juxtaposed to said conductive means, said conductive means having discontinuity adjacent said deforming means between said one portion and said other portion.

4. The ink jet apparatus of claim 3 wherein said conductive means comprises a metallic coating having said discontinuity therein.

5. The ink jet apparatus of claim 3 including more than one said discontinuity.

6. The ink jet apparatus of claim 5 wherein said conductive means includes a conductive bridge, bridging at least one of said more than one discontinuity.

7. The ink jet apparatus of claim 3 wherein said transducer means is substantially cylindrical.

8. The ink jet apparatus of claim 7 wherein said discontinuity encircles said transducer means.

9. The ink jet apparatus of claim 8 wherein said discontinuity extends in a plane along the surface of said transducer means.

10. The ink jet apparatus of claim 3 wherein said transducer means is substantially planar.

11. A method of tuning an ink jet apparatus comprising transducer means, a chamber for containing ink including a drop orifice, said chamber being in communication with said transducer means, and energizing means for applying an operating signal to said transducer means, whereby said chamber expands and contracts in response to the state of energization of said transducer means, for causing emission of an ink drop from said orifice, said method comprising the step of deactivating a portion of said transducer means for changing the active length of said transducer means, thereby permitting matching of said transducer means to said operating signal for optimizing the operation of said ink jet apparatus.

12. The method of claim 11 wherein said transducer means comprises deforming means and conductive means juxtaposed to said deforming means, said step of deactivating comprising the removal of a segment of said conductive means to form a discontinuity therein.

13. The method of claim 12 wherein the removal of said portion conductively separates one portion of said conductive means from another portion of said conductive means.

14. The method of claim 13 including more than one said discontinuity.

15. The method of claim 14 including the step of forming the conductive bridge across at least one of said more than one said discontinuity.

16. The method of claim 13 wherein said segment is removed by chemical etching.

17. The method of claim 13 wherein said segment is removed by a mechanical scribing.

18. The method of claim 17 wherein said mechanical scribing comprises microsandblasting.

* * * * *